(12) United States Patent
Turner

(10) Patent No.: US 8,783,147 B2
(45) Date of Patent: Jul. 22, 2014

(54) NIBBLING TOOL

(75) Inventor: Kenneth John Turner, Armadale (AU)

(73) Assignee: Turner Precision Engineering (AUS) Pty. Ltd., Armadale, WA (US)

( * ) Notice: Subject to any disclaimer, the term of this patent is extended or adjusted under 35 U.S.C. 154(b) by 506 days.

(21) Appl. No.: 12/077,196

(22) Filed: Mar. 17, 2008

(65) Prior Publication Data

US 2009/0229438 A1 Sep. 17, 2009

(51) Int. Cl.
*B26D 5/20* (2006.01)

(52) U.S. Cl.
USPC .............................. 83/237; 83/916; 30/210

(58) Field of Classification Search
USPC ......... 83/916, 693, 698.41, 237, 635; 408/71; 30/210, 241
See application file for complete search history.

(56) References Cited

U.S. PATENT DOCUMENTS

| | | | | | |
|---|---|---|---|---|---|
| 2,217,393 | A | * | 10/1940 | Webb | 30/241 |
| 2,632,950 | A | * | 3/1953 | Hedstrom | 30/241 |
| 2,888,744 | A | * | 6/1959 | Yermish | 30/228 |
| 3,847,049 | A | * | 11/1974 | Bitzel | 83/613 |
| 4,158,913 | A | * | 6/1979 | Batson | 30/241 |
| 4,221,147 | A | * | 9/1980 | Sumida | 83/574 |
| 4,281,459 | A | * | 8/1981 | Krieg | 30/228 |
| 4,312,256 | A | * | 1/1982 | Herzog et al. | 83/694 |
| 4,489,492 | A | * | 12/1984 | Diggins | 30/241 |
| 4,633,743 | A | * | 1/1987 | Ichikawa | 83/100 |
| 4,748,744 | A | * | 6/1988 | Turner | 30/241 |
| 5,044,080 | A | * | 9/1991 | Keller et al. | 30/228 |
| 5,820,999 | A | * | 10/1998 | Li et al. | 428/577 |
| 7,225,711 | B2 | * | 6/2007 | Strong | 83/13 |

FOREIGN PATENT DOCUMENTS

| CN | 1162241 C | 8/2008 |
|---|---|---|
| EP | 0208493 | 1/1987 |

* cited by examiner

*Primary Examiner* — Omar Flores Sanchez
(74) *Attorney, Agent, or Firm* — Davidson, Davidson & Kappel, LLC

(57) ABSTRACT

A nibbling tool (11) adapted to incrementally remove material from an edge of sheet material (96). The nibbling tool (11) comprising a punch (71) adapted to reciprocate within a die (81). The punch (71) is configured to define a substantially radial contact surface (78) having a peripheral edge (79). The die (81) comprises an elongate guide for guiding reciprocation of the punch (71). The die (81) has a slot (87) which is adapted in use to receive said edge of the sheet material (96) and which is so positioned that the radial contact surface (78) on the punch (71) is caused to reciprocate across the slot (87). The slot (87) comprises a support surface (88) adapted to provide support to the sheet material (96) such that in use the peripheral edge of the contact surface (78) is caused to engage the sheet material (96) and cause it to be pressed against said support surface (88) to cause the incremental removal of material from the sheet (96). The punch and die (71, 81) are configured to cause the peripheral edge (79) to initially contact the edge of the sheet material at two points only to commence a cutting action of the sheet material.

15 Claims, 4 Drawing Sheets

NIBBLING TOOL

FIELD OF THE INVENTION

The present invention relates to a nibbling tool adapted to incrementally remove material from an edge of sheet material.

BACKGROUND ART

The inventor of the present invention has previously devised a nibbling tool for shearing sheet material which was disclosed in European patent 0208493. That tool made important advances in the art over previous nibbling tools. The inventor has made further important advances to the art which are now disclosed. Therefore, the specification of EP 0208493 is herein incorporated by reference.

Nibbling tools are used to cut sheet metal incrementally, cutting a small piece at a time but at a high rate. They are particularly useful for cutting channels or sections in such sheet material.

DISCLOSURE OF THE INVENTION

Accordingly, the invention resides in a nibbling tool adapted to incrementally remove material from an edge of sheet material, the nibbling tool comprising a punch caused in use to reciprocate within a die by drive means, the punch comprising a generally elongate cylindrical member having a first diameter and having a waisted portion disposed towards the work end, the waisted portion defining a second, reduced diameter, the punch having an abrupt change between the second, reduced diameter and the first diameter to define a substantially radial contact surface having a peripheral edge, the die comprising an elongate guide for guiding reciprocation of the punch and having a slot proximate a work end of the die adapted to expose the punch, the slot adapted in use to receive said edge of the sheet material and positioned along the die so that at one point of the stoke of the reciprocation of the punch the waisted portion of the punch is positioned in the slot and at another point in the stroke a first diameter portion of the punch is positioned within the slot whereby said radial contact surface is caused to reciprocate across the slot, the slot comprising a support surface adapted to provide support to the sheet material such that in use the peripheral edge of the contact surface is caused to engage the sheet material and cause it to be pressed against said support surface to cause the incremental removal of material from the sheet wherein the plane of the support surface is inclined obliquely relative to a radius of the contact surface in a direction to cause the peripheral edge to initially contact the edge of the sheet material to commence a cutting action of the sheet material.

According to a preferred feature of the embodiment, the punch is adapted to be mounted to a piston associated with the drive means.

According to a preferred embodiment, the piston is caused to reciprocate within a body and the mounting of the punch to the piston is external to the body.

According to a preferred embodiment, the slot forms a foot at the work end of the die, the foot being attached to the die by a leg wherein the width of the leg is substantially the same as the size of the first diameter.

According to a preferred embodiment, an aperture is provided in the die to enable cutting debris to be expelled by the punch.

According to a preferred embodiment, the peripheral edge of the punch is raised from the contact surface to form a cutting edge.

According to a preferred embodiment, the plane of the support surface is inclined obliquely at an angle of 15°. In a most preferred embodiment, the plane of the support surface is inclined obliquely at an angle of between 5° to 7°.

According to another embodiment, the drive means comprises a mechanism housed in a body for causing reciprocation of the punch as a result of rotation of a drive shaft, the mechanism including a reciprocating piston providing a mounting means whereby the punch may be removably mounted to the piston externally to the body.

According to a preferred embodiment, the punch is mounted to the piston by a punch location screw.

According to a preferred embodiment, the punch comprises a flange to be supported by said punch location screw.

According to a preferred embodiment, the die is provide with a widened bore at the end remote from the work end to accommodate reciprocation of the punch location screw.

According to a preferred embodiment the die is provided with means to lock the die in a selected rotational orientation with respect to the body.

In another aspect, the present invention provides a nibbling tool adapted to incrementally remove material from an edge of sheet material, the nibbling tool comprising a punch caused in use to reciprocate within a die, the punch defining a substantially radial contact surface having a peripheral edge, the die having a slot adapted to expose the punch, the slot adapted in use to receive said edge of the sheet material and positioned along the die so that said radial contact surface is caused to reciprocate across the slot, the slot comprising a support surface adapted to provide support to the sheet material such that in use the peripheral edge of the contact surface is caused to engage the sheet material and cause it to be pressed against said support surface to cause the incremental removal of material from the sheet, wherein the plane of the support surface is inclined obliquely by an angle of 5° to 7° relative to a radius of the contact surface in a direction to cause the peripheral edge to initially contact the edge of the sheet material to commence a cutting action of the sheet material.

The invention will be more fully understood in the light of the following description of one specific embodiment.

BRIEF DESCRIPTION OF THE DRAWINGS

The description is made with reference to the accompanying drawings of which.

DETAILED DESCRIPTION OF PREFERRED EMBODIMENTS

Figure 1:
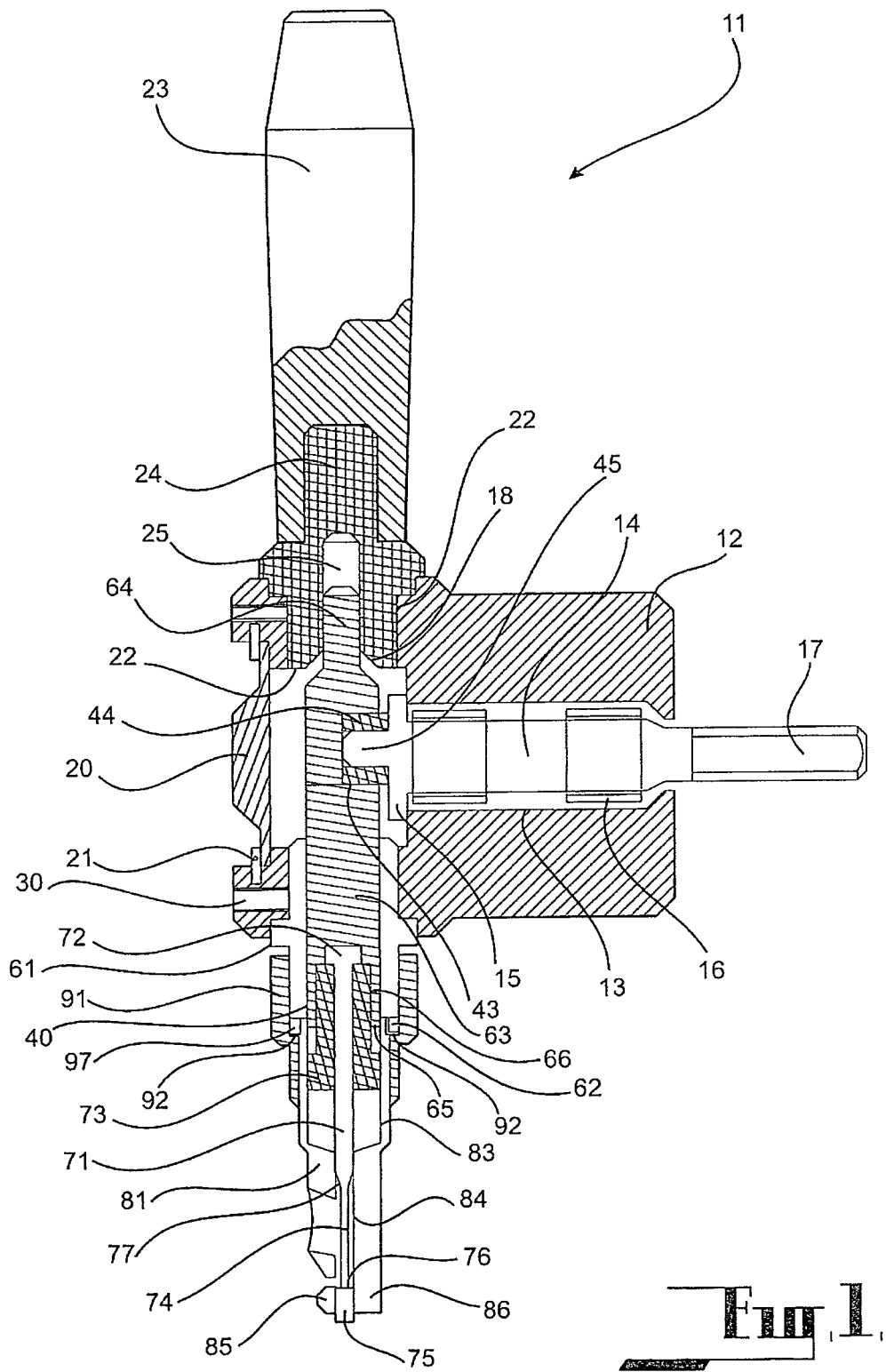
FIG. 1 is sectional elevation of through the embodiment.

An embodiment of the invention is depicted in FIGS. 1 to 4 and is a hand held nibbling tool having a drive means adapted to be coupled to an external rotating drive means such as a conventional drill. The nibbling tool of the embodiment is adapted to be used in any orientation and therefore no particular orientation has any functional significance to the use of the device. However, for convenience, this description describes the device with reference to an upright orientation such as would be used on horizontally positioned sheet material, with the device being operated from above the sheet material, with the terms upper and lower being construed accordingly. However, it is to be understood that this description is in no way intended to impose a restriction on the configuration of the device.

As shown in the drawings, the nibbling tool of the embodiment comprises a body 12 having a first bore 13 in which a rotary drive shaft 14 having a head 15 is mounted in a suitable bearing 16. The projecting end 17 of the shaft 14 is hexagonal to enable it to be easily gripped by, for example, the chuck of a conventional electric drill. The first bore 13 opens to a recess 18 opening to the other side of the body 12. The recess 18 is adapted to be closed by a cover 20 retained by a circlip 21.

A cross bore 22 extends through the body 12 and recess 18 at right angles to the first bore 13. A handle 23 having a threaded handle boss 24 is screwed into the upper part of cross bore 22. The handle 23 may be covered with a rubber or plastics material sleeve grip. The lower end of the handle boss 24 defines a handle boss bore 25. A nose boss 61 is inserted into the lower part of the cross bore 22 and secured in position by a suitable grub screw 30. A nose boss bore 40 extends through the nose boss 61 concentrically with the cross bore 22. A resilient roll pin 62 extends from the external end face of the nose boss 61.

A piston 63 of generally cylindrical form is positioned with the recess 18 concentrically with the cross bore 22. The upper end 64 of the piston 63 is of reduced diameter to be bearingly received within the handle boss bore 25. The lower end 65 of the piston 63 is bearingly received with the nose bore 40 of the nose boss 61. In use, the piston 63 is thereby able to reciprocate within the recess 18, being located by the handle bore 25 and the nose bore 40.

Coupling means for coupling the drive shaft 14 and the piston 63 to convert the rotary movement of the drive shaft 14 to vertical reciprocation of the piston 63 comprises a slot recess 43 in the side of the piston 63. A drive transfer bearing block 44 is slidably located in the recess 43 for horizontal sliding therein and is lightly compressed between the piston 63 and the head of the shaft 15 and receives in a recess therein an eccentric driving pin 45 on the shaft head 15. The bearing block 44 is hexagonal or rectangular sectioned and receives the eccentric pin 45 as a good fit thus providing positive location and support for the bearing block 44. In use, rotation of the eccentrically mounted pin 45 causes reciprocal vertical movement of the block 44 and thereby the piston 63 while the transfer block 44 slides horizontally in the recess 43. Because a considerable area is in contact between the bearing block 44 and the sides of the recess 43, the contact forces are minimised and evenly distributed. This provides a compact, efficient and easily manufactured coupling. It will be appreciated that the stroke of the piston 63 is determined by the relative radial position of the eccentric pin 45.

The lower end 65 of the piston 63 reciprocates between a position substantially flush with the lower mouth of the nose boss 61 and a lower position somewhat extended from the nose boss 61. A threaded recess 66 is formed in the lower end 65 of the piston 63 to receive the upper end 72 of a punch 71. The punch 71 comprises a generally thin, cylindrical elongate member of tool steel and the upper end 72 is held within the threaded recess 66 by a punch location screw 73, having a bore adapted to receive the punch 71.

The punch 71 is provided with a waisted portion 74 of reduced diameter disposed somewhat from the lower end of the punch to provide a head portion 75 at the lower end. The diameter of the head portion 75 defines the cutting diameter of the punch of the embodiment and, in the embodiment, is the same as the diameter of the upper portion of the punch 71. The lower end 76 of the waisted portion provides an abrupt transition between the reduced diameter of the waisted portion 74 and the larger diameter of the head portion 75 to thereby define a annular contact surface 78 with a circumferential peripheral cutting edge 79. The upper junction 77 of the waisted portion provides a gradual transition from the larger diameter of the upper portion to the reduced diameter of the waisted portion 74.

A die 81 is of generally cylindrical form having a radial flange 82 extending radially outwardly at the upper end. A plurality of notches 97 are set into the end face of the flange 82. The flange 82 of the die 81 is adapted to abut the end face of the nose boss 61 and to be locked against rotation by the roll pin 62 engaging a notch 97. The notches 97 and the roll pin 62 thus allow for the relative axial rotation position between the die 81 and the nose boss 61 to be set as desired for cutting with different tool orientations. The die 81 is adapted to be locked to the nose boss 61 by a nose cap 91 which threadably engages the nose boss 61. The nose cap 91 has an inner flange 92 adapted to bear upon the flange 82 of the die 81. The lower end of nose cap 91 is provided with a hexagonal profile to enable it to be tightened to the nose boss 61 by an appropriate spanner.

A first die bore 83 is provided in the upper portion of the die 81 to accommodate the punch location screw 73 during reciprocation. A smaller, second die bore 84 extends through the remainder of the die 81 to serve as a guide to the punch 71 during reciprocation. The outer diameter of the die upper portion is greater than that of the die lower portion to accommodate the differences in diameter of the bores 83 and 84 and to improve stiffness in the die upper portion.

Figure 2:
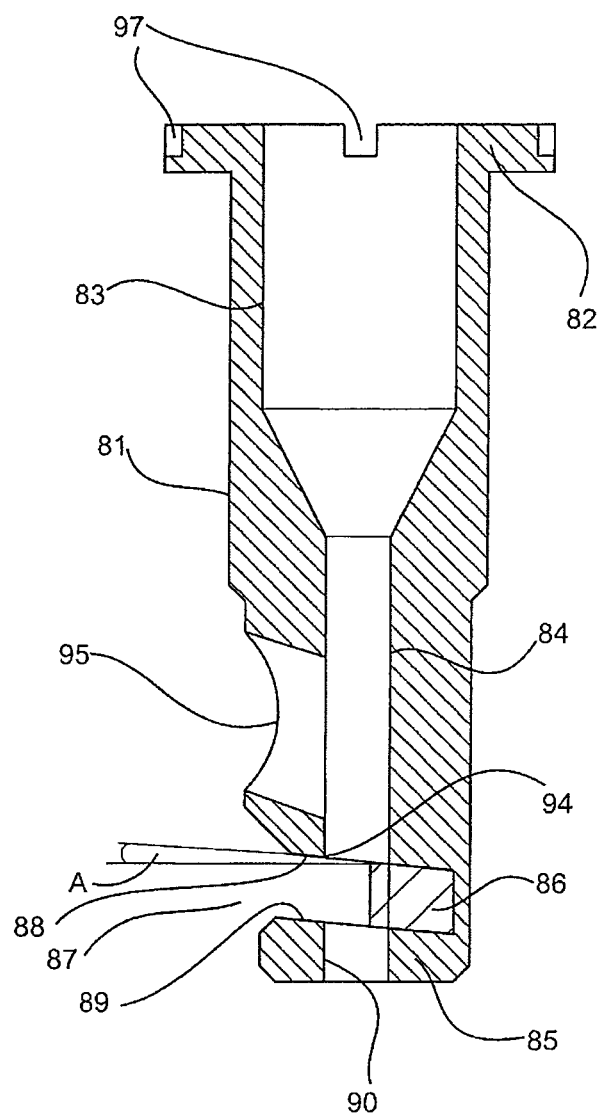
FIG. 2 is an enlarged sectional view of the die of the embodiment shown in FIG. 1.
Figure 4:
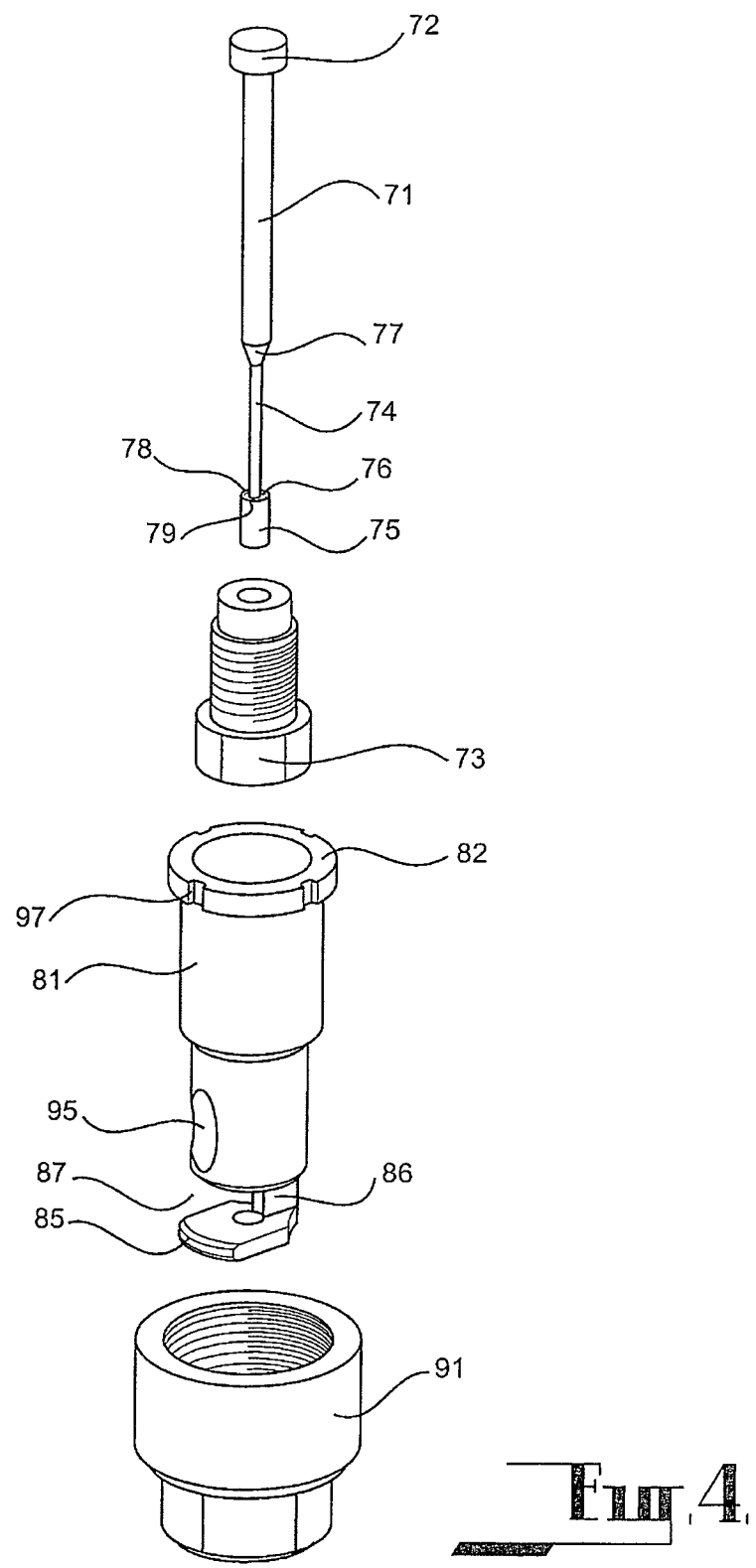
FIG. 4 is an exploded view of the punch and die portion of the embodiment.

The lower portion of the die 81 is cut away from one side, to leave a foot portion 85 attached to the main body of the die 81 by a leg portion 86. As shown in FIGS. 2 and 4 the cut-away defines a slot 87 in the die with parallel opposed slot faces, upper face 88 and lower face 89 which when viewed in a side elevation relative to the leg portion 86 can be seen to be angled upwardly relative to a radial direction from the central axis at an angle A. The leg portion 86 is substantially the same thickness or a little smaller as the punch cutting diameter so that it fits in the cut being formed in material and facilitates material feed. The foot portion 88 is provided with a bore 90 co-axially aligned with bore 84 to receive and guide the head portion 75 of the punch 71 during its reciprocating motion. An aperture 95 is provided from the side of the die opposed to the leg portion 86 adjacent to the slot 87 providing entry into the second die bore 84 in the vicinity of the waisted portion of the punch 71 to allow for the clearance of swarf, dirt etc. The aperture 95 is of cylindrical configuration with a central axis angled obliquely relative to the central axis of the punch to enable the aperture to extend as closely as practicable to the slot 87.

An edge 94 is defined at the boundary between the upper slot face 88 and the second die bore 84. This edge 94 is configured to cooperate with the upper circumferential cutting edge 79 of the head portion 75 of the punch 71 to provide a cutting action upon sheet material placed in the slot 87 as the punch 71 slides upwardly.

In the prior art, the surface corresponding with the upper slot face 88 was oriented transversely to the central axis of the punch. As a result, when the head portion 75 of the punch 71 contacted the sheet within the slot 87, an area of metal was contacted by the annular contact surface 78 substantially at one moment. The material removal action was therefore achieved by a pure shearing action upon the sheet. Due to the pliability of the material, the shearing action tended to produce burrs.

In an alternative arrangement of the prior art, the transition between the waisted portion of the punch and the head portion was made gradual, such that the contact surface would be substantially conical in form. Such an arrangement would result in contact which also inherently tended to produce burrs.

Figure 3:
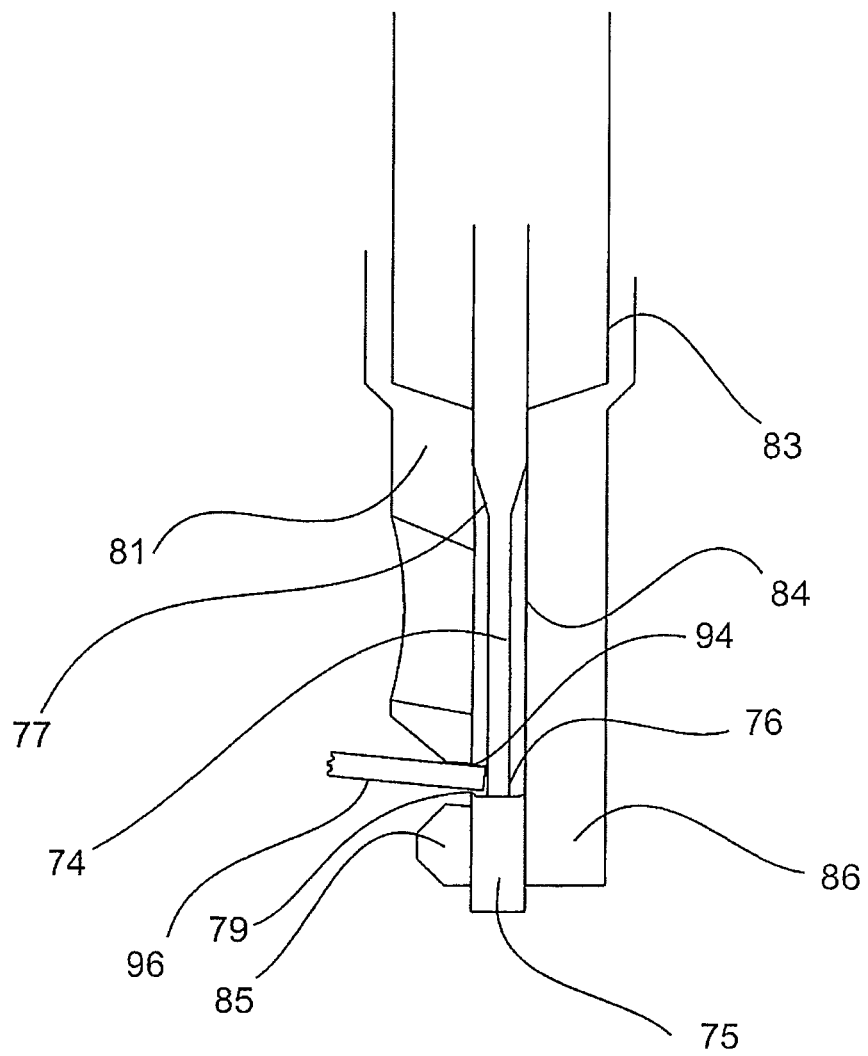
FIG. 3 is an enlargement of the work end of the die as shown in FIG. 2 showing the punch acting on a piece of sheet material.

As shown in FIG. 3, in the present arrangement, because the sheet 96 is caused to be oriented at an angle relative to the annular contact surface 78 due to the orientation of the upper slot face 88, the circumferential cutting edge 79 initially contacts the sheet material 96 at two points only at the edge of the sheet material 96. As the punch 71 travels along its cutting stroke, the cutting edge 79 causes a progressive cutting action on the material 96 rather similar to that of scissors cutting a sheet of paper. As a result, a much cleaner removal of the material is achieved and burring is reduced. The optimum angle A of the plane of the upper slot face 88 relative to a transverse plane will depend upon the precise configuration of the die, but an angle of about 15° has been found suitable for the configuration of the embodiment. On further development of the invention, an angle of 5° to 7° has been found to be particularly advantageous. This angle has been found to contribute to a reduction in swarf distortion during cutting reducing the chance of machine stuttering, typically caused by the rolling effect of the swarf edge between the punch 71 and die 81, and also producing quicker and cleaner ejection of the swarf pieces. This angle also contributes to a further reduction in burring of the sheet material edge as a result of the flatter swarf chip.

It will be appreciated that the embodiment provides several other important advantages over the prior art. The provision a reciprocating piston separate from the punch has several benefits. It provides a more substantial reciprocating member which can be expected to provide long life. It enables a simpler coupling arrangement which is less expensive to manufacture and more reliable. It enables the punch to be attached outside the body of tool so that there is no need to gain access the body to change the punch. It enables a variety of punch and die configurations to be provided and swapped quickly. In addition, the greater mass of the piston increases the overall momentum of the reciprocating assembly, which assists the cutting action.

It will be appreciated that the embodiment described may be adapted in many ways while still encompassing the advantageous features described above. First, the embodiment may be adapted to incorporate a drive motor within the body. Secondly, the die and punch arrangement could be adapted to provide a cutting action upon the downward stroke rather than the upward stroke, or indeed, upon both the downward and upward strokes. It is understood that all such modifications and adaptations are to be considered as within the scope of the invention.

Throughout the specification, unless the context requires otherwise, the word "comprise" or variations such as "comprises" or "comprising", will be understood to imply the inclusion of a stated integer or group of integers but not the exclusion of any other integer or group of integers.

The claims defining the invention are as follows:

1. A nibbling tool adapted to incrementally remove material from an edge of sheet material, the nibbling tool comprising a punch caused in use to reciprocate within a die by drive means, the punch comprising a generally elongate cylindrical member having a first diameter and having a waisted portion disposed towards the work end, the waisted portion defining a second, reduced diameter, the punch having an abrupt change between the second, reduced diameter and the first diameter to define a substantially radial contact surface having a circumferential peripheral cutting edge, the die comprising an elongate guide for guiding reciprocation of the punch and having a slot proximate a work end of the die adapted to expose the punch, the slot adapted in use to receive said edge of the sheet material and positioned along the die so that at one point of the stroke of the reciprocation of the punch the waisted portion of the punch is positioned in the slot and at another point in the stroke a first diameter portion of the punch is positioned within the slot whereby said radial contact surface is caused to reciprocate across the slot, the slot comprising a first support surface and a second support surface opposing the first support surface in a spaced relationship, the punch is adapted to cut the edge of the sheet material as it travels in a first direction from the second support surface to the first support surface, the first and second support surfaces are adapted to provide support to the sheet material such that in use and during an upward stroke of the punch the circumferential peripheral cutting edge of the contact surface of the punch is caused to engage the sheet material and cause it to be pressed against at least the first support surface to cause the incremental removal of material from the sheet wherein the plane of the first support surface is inclined in a second direction opposite the first direction and with the first support surface located in front of the punch when viewed from exterior of the die in a direction perpendicular to a central axis of the punch, wherein the punch and the die are configured such that when the punch engages the sheet material the sheet material is caused to be oriented at an angle relative to the radial contact surface due to the orientation of the first support surface, the circumferential peripheral cutting edge initially contacts the sheet material at two points only at the edge of the sheet material, and as the punch travels in the first direction, the cutting edge causes a progressive cutting action on the material.

2. The nibbling tool of claim 1 wherein the punch is adapted to be mounted to a piston associated with the drive means.

3. The nibbling tool of claim 2 wherein the piston is caused to reciprocate within a body and the mounting of the punch to the piston is external to the body.

4. The nibbling tool of claim 1 wherein the slot forms a foot at the work end of the die, the foot being attached to the die by a leg wherein the width of the leg is substantially the same as the size of the first diameter.

5. The nibbling tool of claim 1 wherein an aperture is provided in the die to enable cutting debris to be expelled by the punch.

6. The nibbling tool of claim 1 wherein the circumferential peripheral cutting edge of the punch is raised from the contact surface to form a cutting edge.

7. The nibbling tool of claim 1 wherein the plane of the support surface is inclined obliquely at an angle of about 15°.

8. The nibbling tool of claim 1 wherein the plane of the support surface is inclined obliquely at an angle of between 5° to 7°.

9. The nibbling tool of claim 1 wherein the drive means comprises a mechanism housed in a body for causing reciprocation of the punch as a result of rotation of a drive shaft, the mechanism including a reciprocating piston providing a mounting means whereby the punch may be removably mounted to the piston externally to the body.

10. The nibbling tool of claim 9 wherein the punch is mounted to the piston by a punch location screw.

11. The nibbling tool of claim 10 wherein the punch comprises a flange to be supported by said punch location screw.

12. The nibbling tool of claim 10 wherein the die is provided with a widened bore at the end remote from the work end to accommodate reciprocation of the punch location screw.

13. The nibbling tool of claim 9 wherein the die is provided with means to lock the die in a selected rotational orientation with respect to the body.

14. A nibbling tool adapted to incrementally remove material from an edge of sheet material, the nibbling tool comprising a punch caused in use to reciprocate within a die, the punch defining a substantially radial contact surface having a circumferential peripheral cutting edge, the die having a slot adapted to expose the punch, the slot adapted in use to receive said edge of the sheet material and positioned along the die so that said radial contact surface is caused to reciprocate across the slot, the slot comprising a first support surface and a second support surface opposing the first support surface in a space relationship, the punch is adapted to cut the edge of the sheet material during an upward stroke as it travels in a first direction from the second support surface to the first support surface, the first and second support surfaces are adapted to provide support to the sheet material such that in use the circumferential peripheral cutting edge of the contact surface of the punch is caused to engage the sheet material and cause it to be pressed against at least the first support surface to cause the incremental removal of material from the sheet, wherein the plane of the first support surface is inclined in a second direction opposite the first direction and with the first support surface located in front of the punch when viewed from exterior of the die in a direction perpendicular to a central axis of the punch, the plane of the first support surface is inclined by an angle of 5° to 7° relative to the direction perpendicular to the central axis of the punch and wherein the punch and the die are configured such that when the punch engages the sheet material the sheet material is caused to be oriented at an angle relative to the radial contact surface due to the orientation of the first support surface, the circumferential peripheral cutting edge initially contacts the sheet material at two points only at the edge of the sheet material, and as the punch travels in the first direction, the cutting edge causes a progressive cutting action on the material.

15. A nibbling tool adapted to incrementally remove material from an edge of sheet material, the nibbling tool comprising a punch caused in use to reciprocate within a die, the punch defining a substantially radial contact surface having a circumferential peripheral cutting edge, the die having a slot adapted to expose the punch, the slot adapted in use to receive said edge of the sheet material and positioned along the die so that said radial contact surface is caused to reciprocate across the slot, the slot comprising a first support surface and a second support surface opposing the first support surface in a spaced relationship, wherein the first support surface comprises a first peripheral edge and the second support surface comprises a second peripheral edge offset from the first peripheral edge relative to a central axis of the punch, the plane of each of the first and second support surfaces is inclined relative to a direction perpendicular to the central axis of the punch, the punch is adapted to cut the edge of the sheet material during an upward stroke as it travels in a first direction from the second support surface to the first support surface, and when in use as the punch travels in said direction to cut the edge of the sheet material, the circumferential peripheral cutting edge of the contact surface of the punch is adapted to engage the sheet material causing a side of the sheet material to be pressed against the first peripheral edge and an opposing side of the sheet material to be pressed against the second peripheral edge and causing the incremental removal of material from the sheet, wherein the plane of the first support surface is inclined in a second direction opposite the first direction and with the first support surface located in front of the punch when viewed from exterior of the die in a direction perpendicular to the central axis of the punch and wherein the punch and the die are configured such that when the punch engages the sheet material the sheet material is caused to be oriented at an angle relative to the radial contact surface due to the orientation of the first support surface, the circumferential peripheral cutting edge initially contacts the sheet material at two points only at the edge of the sheet material, and as the punch travels in the first direction, the cutting edge causes a progressive cutting action on the material.

* * * * *